(12) United States Patent
Readler

(10) Patent No.: US 9,386,667 B2
(45) Date of Patent: Jul. 5, 2016

(54) ENCODED LIGHT-ACTIVATED ILLUMINATION

(71) Applicant: Blaine Clifford Readler, San Diego, CA (US)

(72) Inventor: Blaine Clifford Readler, San Diego, CA (US)

( * ) Notice: Subject to any disclaimer, the term of this patent is extended or adjusted under 35 U.S.C. 154(b) by 151 days.

(21) Appl. No.: 14/191,369

(22) Filed: Feb. 26, 2014

(65) Prior Publication Data

US 2015/0245448 A1    Aug. 27, 2015

(51) Int. Cl.
| | |
|---|---|
| H04B 10/00 | (2013.01) |
| H05B 37/02 | (2006.01) |
| H04B 10/116 | (2013.01) |
| G08C 23/00 | (2006.01) |
| G08C 17/00 | (2006.01) |

(52) U.S. Cl.
CPC ............ *H05B 37/0272* (2013.01); *G08C 17/00* (2013.01); *G08C 23/00* (2013.01); *H04B 10/116* (2013.01)

(58) Field of Classification Search
CPC ........... H04B 10/1143; H04B 10/1149; H04B 10/116
See application file for complete search history.

(56) References Cited

U.S. PATENT DOCUMENTS

| | | | |
|---|---|---|---|
| 4,048,596 A | 9/1977 | Kolm | |
| 4,153,860 A | 5/1979 | Vonick | |
| 4,629,941 A | 12/1986 | Ellis | |
| 5,412,284 A | 5/1995 | Moore | |
| 5,949,328 A * | 9/1999 | Latty | G08B 21/24 340/309.16 |
| 8,521,035 B2 | 8/2013 | Knapp | |
| 8,554,084 B2 | 10/2013 | Song | |
| 2008/0185969 A1 | 8/2008 | Vegter | |
| 2008/0211412 A1 | 9/2008 | Chen | |
| 2009/0129782 A1 | 5/2009 | Pederson | |
| 2010/0295457 A1 | 11/2010 | Lu | |
| 2011/0063214 A1* | 3/2011 | Knapp | H04L 12/43 345/158 |
| 2015/0015147 A1* | 1/2015 | Knapp | G09G 3/2003 315/155 |
| 2015/0097775 A1* | 4/2015 | McCartney | G06F 3/0346 345/158 |

FOREIGN PATENT DOCUMENTS

| | | |
|---|---|---|
| EP | 0734197 B1 | 9/1996 |
| EP | 2208395 B1 | 11/2008 |
| EP | 2522900 A1 | 1/2010 |

\* cited by examiner

*Primary Examiner* — Dzung Tran

(57) ABSTRACT

A method for controlling detached lighting units uses source light of a capable flashlight to communicate information. The capable flashlight encodes an ID Tag in modulated light, and the detached lighting units recognize the specific ID Tag and responds, for example by activating and creating illumination. A user can illuminate selected areas by shining the beam of the flashlight on detached lighting units to selectively activate them, and since the detached lighting units only respond to the encoded light, unintended activation is avoided. In addition to the encoded ID Tag, mode information can be included such that the detached lighting units can respond in a number of ways, such as selected periods of activation. Stored ID Tags can be transferred and thus shared using the same modulated light. ID Tags can be randomly re-assigned, and the new value shared among other flashlights and detached lighting units, creating a coordinated set.

13 Claims, 10 Drawing Sheets

ENCODED LIGHT-ACTIVATED ILLUMINATION

CROSS-REFERENCE TO RELATED APPLICATIONS

Not Applicable.

SEQUENCE LISTING

Not Applicable

BACKGROUND

1. Field of Invention

This invention relates to remotely controlled illumination, and specifically to remote control of illumination via modulated light of a flashlight.

2. Description of Prior Art

Outdoor lighting traditionally consists of light fixtures powered by AC mains, mounted to outside walls, and activated either by wall-mounted switches or co-located motion sensors. These methods serve admirably for areas in the near proximity of a house or other structure connected to AC power such as a garage, but leave areas beyond the reach of the structure-mounted lighting in darkness.

With the advent of energy efficient LEDs and economical photo-electric power cells, self-contained solar-powered lighting systems have become popular. However, because of the limited solar charging energy available each day, and the economical limits of storage battery capacity, these systems provide just small circles of dim illumination close to the ground, sufficient for marking walkways, but little else. The dim output is necessary since the stored energy of the batteries must last for an extended period of time. Most battery-powered lighting systems are outfitted with a light sensor that detects the onset of darkness and activates the unit, which to be useable, must then operate for some multiple of hours. Even using energy efficient LEDs as a light source, the available instantaneous power must be extremely limited such that operation can be meted out for the necessary entire period.

The goal would be to activate the lighting unit just when actually needed, which for most practical instances would be for just a few minutes. If only needed for three minutes of use, the lighting device could deliver one hundred times as much power to the illuminating LEDs than if the power were required to last continuously for five hours.

One method to activate the lighting unit momentarily would be via motion detection. However, outdoor motion detectors are notorious for spurious tripping, whether by pets, nighttime animals, wind-blown foliage, etc., and whereas this is a minor annoyance when the light source is powered by AC mains, the false trips would quickly deplete the lighting unit's batteries, leaving the device useless when actually needed.

Another method would be to use radio control such as is used for opening garage doors. U.S. patent application 2010/0,295,457 A1 and European Patent 0734197 describe the use of wireless control of indoor light fixtures, while U.S. patent application 2008/0,211,412 A1 and European Patent 2522900 A1 describe the use of wireless control for outdoor battery-powered lighting systems. However, unlike a garage door, of which there is typically just one, outdoor lighting systems typically consist of multiple units dispersed around an area, and it would be disadvantageous to activate them all simultaneously, since those units not actually usefully activated would be needlessly dissipating their power storage.

Infrared energy could be focused and beamed in order to activate individual targeted lighting units, however since the energy is invisible, aiming the beam is difficult and only approximate. European Patent 0734197 describes using a visible laser to aid in aiming a beam to control indoor overhead fixtures, but laser technology is relatively expensive.

Better than the expense of a laser would be to use the growing application of visible light communication (VLC), whereby control communication is achieved using the same energy-efficient LEDs as is deployed in the outdoor light systems themselves. Examples of forerunners of this technology can be found in U.S. Pat. Nos. 5,412,284 and 4,153,860 which use photo-sensors to detect static light for controlling Christmas lights, and U.S. Pat. No. 4,629,941, which activates security lights by car headlights. U.S. Pat. No. 4,048,596 describes controlling a television by using two differential photocell devices for distinguishing a flashlight beam.

More recent examples of VLC use in lighting systems are European Patent 2208395 B1, which uses organic LEDs to both source illumination and receive control information, and U.S. Pat. No. 8,554,084, U.S. Pat. No. 8,521,035, and U.S. patent applications 2009/0129782, and 2008/0185969, which all use information communicated from the fixed illumination source to a remote device, i.e., in the opposite direction from that needed to the light source as required to selectively activate outdoor lighting units.

VLC techniques could potentially be used to selectively enable outdoor lighting units. Further, not only would it be advantageous to use cost-effective VLC technology to activate outdoor lighting units, but it would be additionally useful if the VLC control communication source could be integrated with a device that would already naturally accompany a nighttime excursion situation.

SUMMARY OF THE INVENTION

Here, the term detached lighting will refer to any lighting that is not within convenient access to AC power mains. As such, this would include not only lights positioned outside of structures, but also lights within structures not wired for AC power, such as sheds, barns, etc.

In accordance with the present invention, a method for selectively controlling detached lighting units uses the modulated source light of a hand-held flashlight—a device that naturally accompanies a nighttime excursion—to communicate control information. In this way a user navigating an area after dark merely needs to shine the flashlight on strategically placed detached lighting units to activate them, thus illuminating selected parts of the area.

The flashlight source and responding detached lighting unit share identification tags in order to avoid unintended activation. The encoded control information includes a specific pattern such that the detached lighting unit responds specifically to the particular flashlight source, thus avoiding unintended activation and the accompanying unnecessary draw of stored energy. The preferred embodiment of the invention includes an identification tag that is specific to and shared by the source flashlight and the detached lighting unit such that the outdoor lighting unit only responds when it recognizes the shared tag.

In one embodiment, the detached lighting unit can be placed into a learning mode whereby it can automatically acquire the shared tag from the source flashlight. Additionally, the source flashlight itself can also be placed into a learning mode whereby it can automatically acquire the shared tag from another source flashlight. In this way, a multitude of detached lighting sources and spare source flashlights can all be configured to share the same identification tag from one master source flashlight. Any source flashlight can serve as a master, simply by using it to provide the learned identification tag to other source flashlights or detached lighting units.

In another embodiment, a source flashlight can be directed to randomly change its identification tag. When then used as the master source flashlight, an entire system of detached lighting units and spare source flashlights can be thusly reconfigured to a new identification tag. This would be useful when, for example, a different, adjacent system of detached lighting units is found to contain the same identification tag.

In yet another embodiment, when selectively activated by a source flashlight, the detached lighting units enter a mode in which they automatically deactivate themselves after a period of time. The period of time can be optionally configured. Also optionally, the detached lighting units can be selectively deactivated upon command from the source flashlight. Additionally, the source flashlight can communicate the desired activation time of the detached lighting units, as well as optionally the desired illumination intensity level. In this way, the stored energy of the detached lighting units can be maximally used.

When used inside enclosures such as unpowered barns or sheds, the detached lighting units operate from replaceable batteries. When used outdoors, however, the detached lighting units can optionally be outfitted with solar cell charging means to automatically recharge the unit's batteries during daylight hours.

In yet another embodiment, the detached lighting units include an ambient light sensor that places them in a low-power "sleep" mode during daytime when they would not be expected to be activated, thus further conserving battery energy.

In yet a further embodiment, the communication information is digital in nature whereby both the source flashlight and the detached lighting unit use the same nominal clock frequency. Portions of the digital information are logically XORed with the clock, a signal with periodic alternating logic levels, in order to maintain a constant average on time. Since the intensity of the light produced by the source flashlight is proportional to the on time, the effect is a constant source of illumination for the user with virtually no flickering that would otherwise accompany information encoded on the light.

DETAILED DESCRIPTION OF THE INVENTION

According to the invention described here, detached lighting units are made to selectively activate only at specific times as controlled by the light of a capable handheld flashlight. The light of the flashlight is encoded with information, and in this way the lighting units do not respond to normal light, whether the ambient light of daytime, or miscellaneous stray light from car headlights, neighbors lights, etc.

Figure 1:
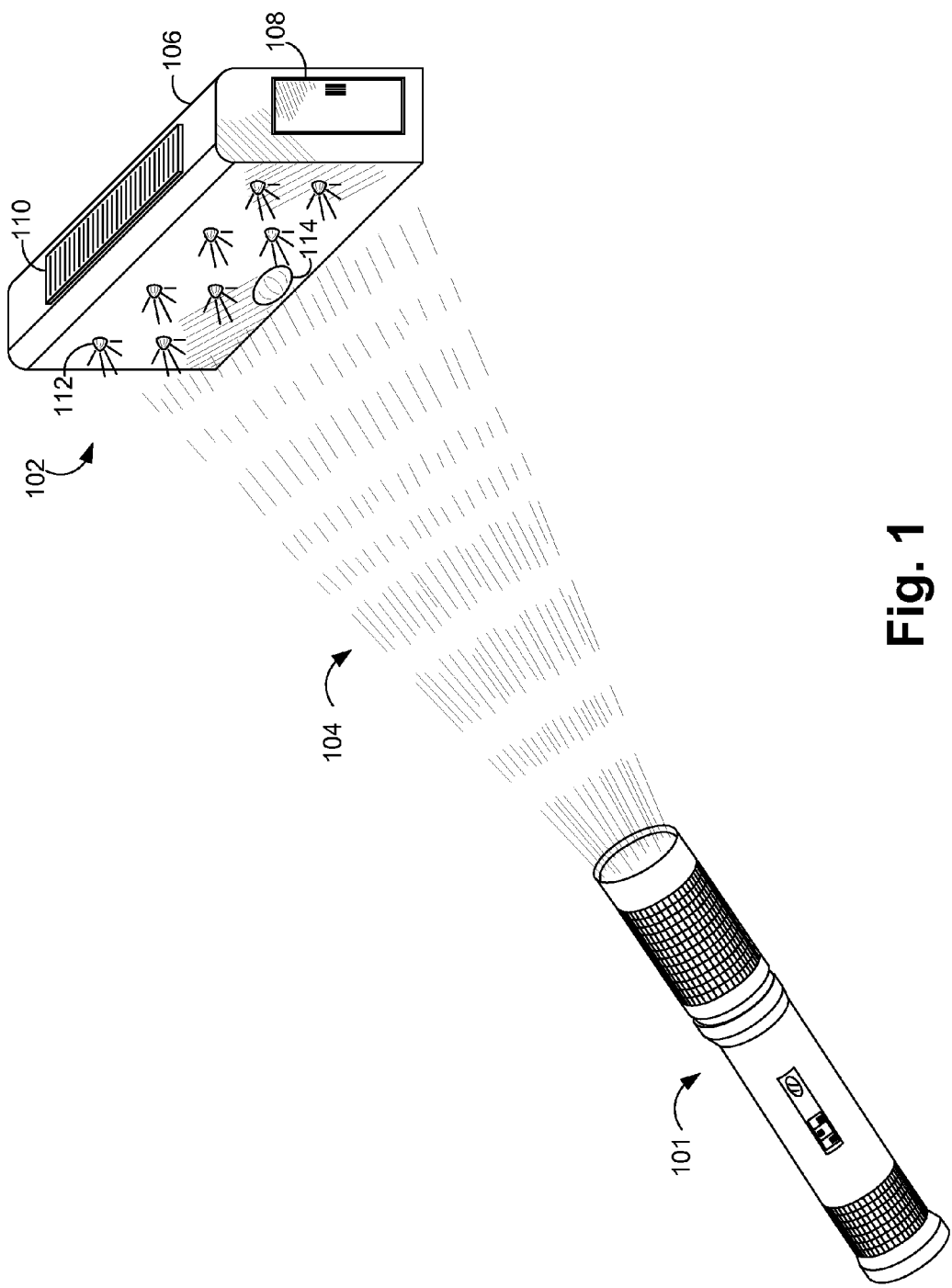
FIG. 1 shows an embodiment of the encoded-light source flashlight activating an embodiment of the target detached lighting unit using encoded light.

Source Flashlight and Target Detached Lighting Unit, FIG. 1

FIG. 1 shows an embodiment 101 of the encoded-light source flashlight activating an embodiment 102 of the target detached lighting unit using encoded light 104. The detached lighting unit 102 is contained within enclosure 106, and includes a battery compartment as accessed by removable cover piece 108. Optional solar cell panel 110 allows recharging of batteries during daylight. LED 112 is one of an array for providing illumination. Optical sensor input 114 provides a means for the detached lighting unit to respond to communications from the flashlight, as will be explained later.

When implemented using the novel encoding scheme described later, the target lighting unit, while immune to normal light sources, is highly sensitive to the encoded light of the flashlight, so that a quick sweep of the flashlight beam across the target lighting unit is sufficient to activate it. Thus, an approaching user need not even pause to illuminate the area ahead.

Figure 2:
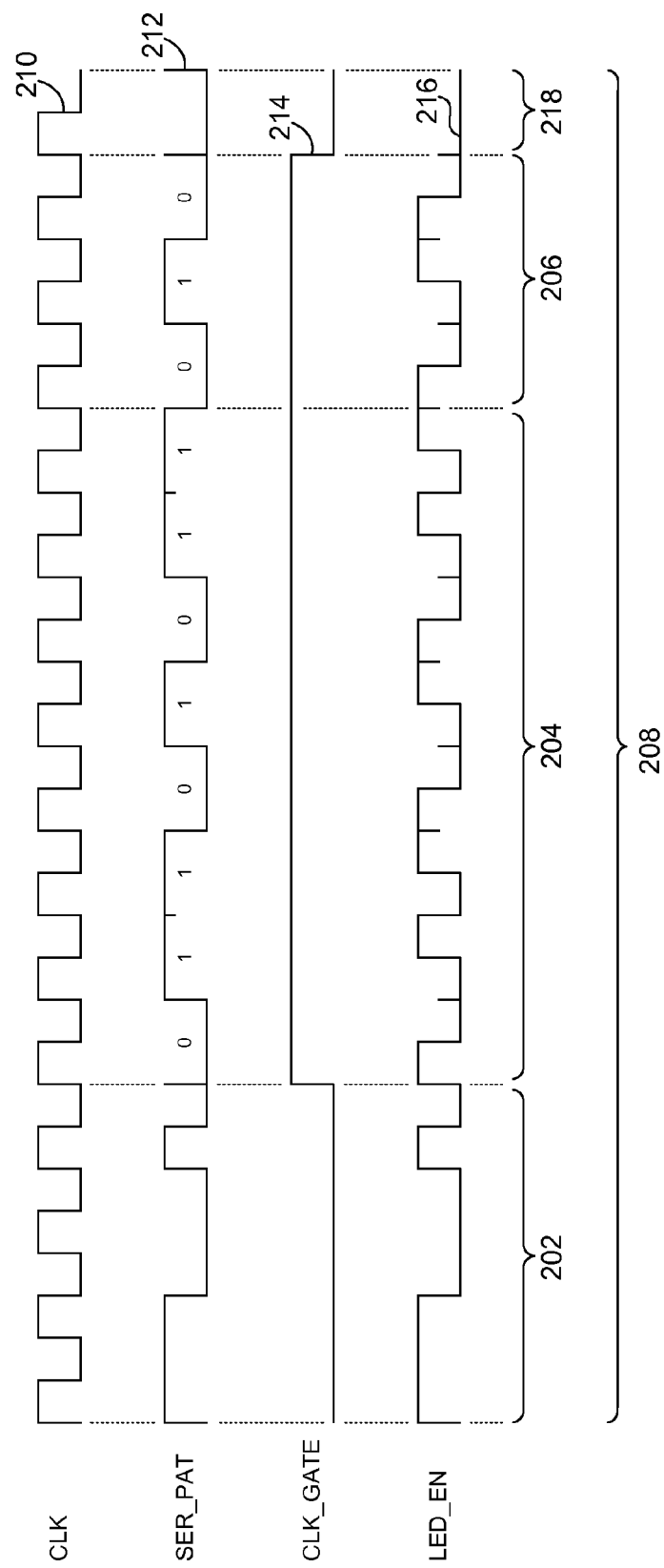
FIG. 2 illustrates an example of the encoded signal that modulates the source flashlight's light.

Encoded Signal, FIG. 2

FIG. 2 illustrates an example of the encoded signal that modulates the source flashlight's light. Clock signal CLK 210, a signal with periodic alternating logic levels, provides a reference for establishing bit boundaries of the signal pattern. Serial pattern signal SER_PAT 212 comprises an example of an encoding signal, consisting of a fixed preamble 202, an ID Tag 204, which consists of a specific pattern, and comprises the unique shared label for this flashlight/lighting unit pair, Mode signal 206, which will be explained later, and end marker 218. Together these comprise a packet of serial transmission 208 that is continually repeated, such that the end of End Marker 218 is immediately followed by the beginning of Preamble 202.

The preamble and end marker are the same for all flashlight/lighting unit pairs, while the ID Tag—here composed of the example binary value 01101011—is selected to be unique between different flashlight/lighting unit pairs. The Mode value—here the example binary value 010—communicates the type of operation for which the lighting unit is directed to perform.

The CLK_GATE signal 214 defines the time when the serial pattern signal SER_PAT is further encoded by the CLK signal. The encoding here consists of a logical XOR, and the serial pattern signal SER_PAT is logically XOR'd with the CLK signal when CLK_GATE is high. In communications fields, this type of encoding is known as Manchester encoding. In this application, the encoding guarantees equal amounts of high and low periods. This has the distinct advantage that the resulting average light intensity when driving the flashlight's LEDs is constant, avoiding annoying flickering. It provides a second advantage in that it guarantees that each bit time includes at least one transition from low to high, or high to low. As will be explained later, this provides advantageous opportunities for the target lighting unit to recalibrate the arriving bit time delineations.

The preamble 202 provides a universally recognizable component of the serial signal that receiving detection logic can use to synchronize the alignment of the complete packet. This is described later in the description of the target lighting unit operation. Note that, like the XORed ID Tag and Mode, the preamble is arranged to contain equal amounts of high and low periods.

Figure 3:
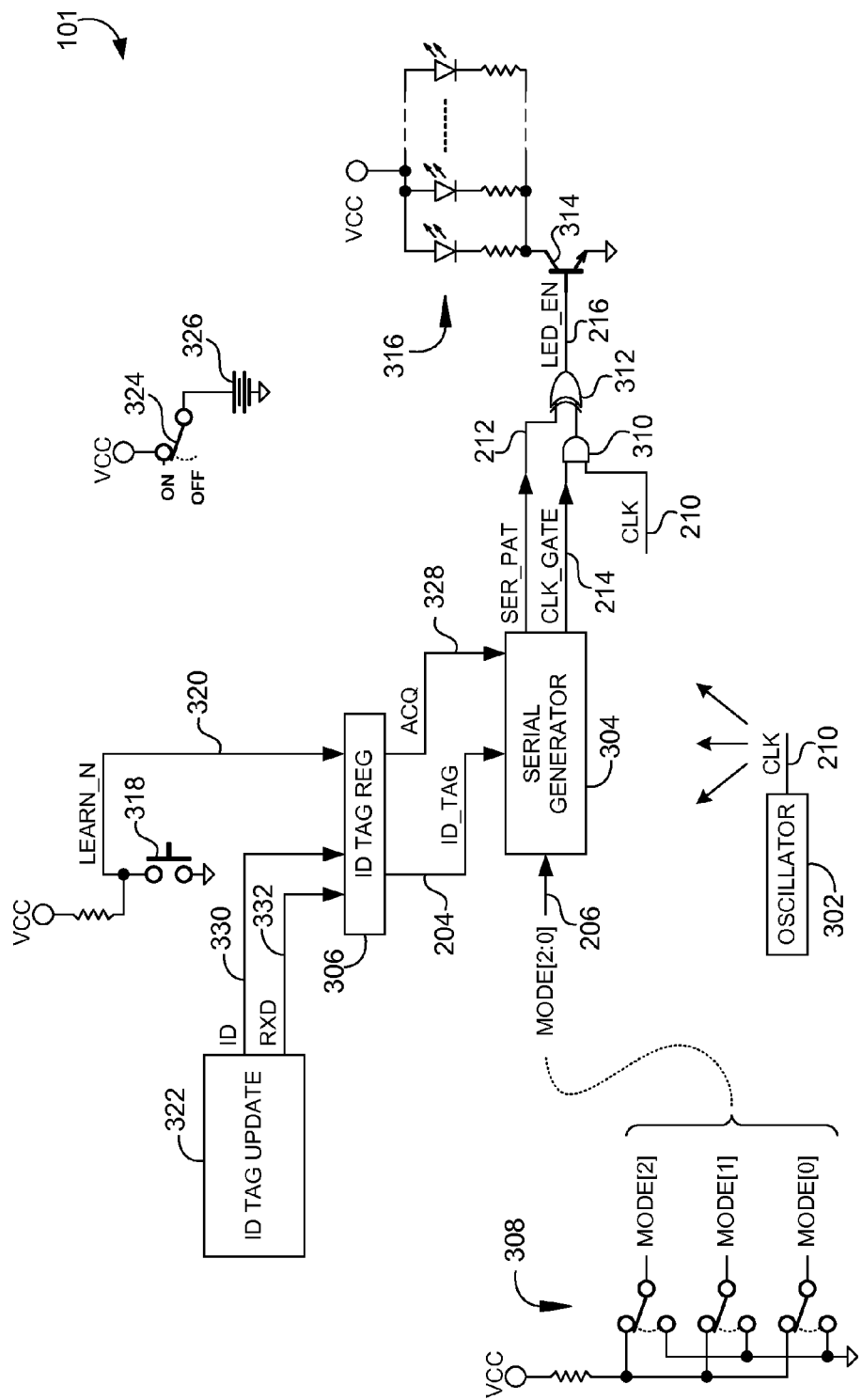
FIG. 3 shows a functional block diagram of the encoded-light source flashlight.

Source Flashlight Functional Block Operation, FIG. 3

FIG. 3 shows a functional block diagram of the encoded-light source flashlight. Oscillator 302 provides the free-running clock signal CLK 210 shown in previous FIG. 2. Besides providing for the XOR encoding of SER_PAT signal 212, the clock serves as the general operating clock signal for all functional blocks implementing clocked digital processes, as illustrating by the dispersing arrows. The period of this clock constitutes a fundamental parameter of operation, since it determines a key transmission characteristic of the encoded packet described in the previous section. Specifically, the frequency of the clock establishes the frequency of transmission. The frequency must be sufficiently high so as not to degrade the responsive behavior of the target lighting unit, yet not so high that the transmission itself is jeopardized. A five kilohertz clock is used for the preferred embodiment, and results in a three millisecond packet, which provides virtual instantaneous recognition and response from the target lighting unit, yet lies well within the capabilities of the receiving circuitry, predominantly limited by the optical sensor response.

Serial Generator 304 accepts a parallel form of the ID Tag 204, as well as a parallel form of the Mode 206, both described in the previous section, and serializes them, along with the previously described preamble, to produce the serial SER_PAT signal 212. Serial Generator 304 comprises essentially a continually repeating parallel-to-serial converter, e.g., a loadable shift register, and its details are not included here since such practice is well known in the art of digital design.

As explained in the previous section, a portion of the serial signal SER_PAT is XOR'd with the clock, as gated by CLK_GATE signal 214, and AND gate 310 and XOR gate 312 accomplish this. The resulting signal LED_EN 216 enables transistor 314 during the high bit times to draw current through illumination LEDs 316, thus activating them. Although the LEDs are pulsing light at a rate nominally the same as clock signal CLK 210, the frequency is sufficiently high, i.e., five kilohertz, that the human eye perceives a smooth, continuous illumination.

Mode signal 206 is shown as settable by three SPDT switches 308, but one practiced in the art will recognize that the three-bit value could be created by a number of other means; as for example a single push-button switch that increments through up to eight possible binary values, with user feedback provided by a small LCD display. Another possible embodiment would include individual push buttons for each of up to eight mode states that Serial Generator block 304 could encode into a three-bit value.

ID TAG REG block 306 stores the ID TAG 204 value. Push button 318 via signal LEARN_N 320, along with ID Tag Update block 322, are used to update the ID Tag value, and this is explained in detail in a later section.

SPST switch 324 provides a means to disconnect battery voltage 326 from the circuitry when the flashlight is not in use.

Figure 4:
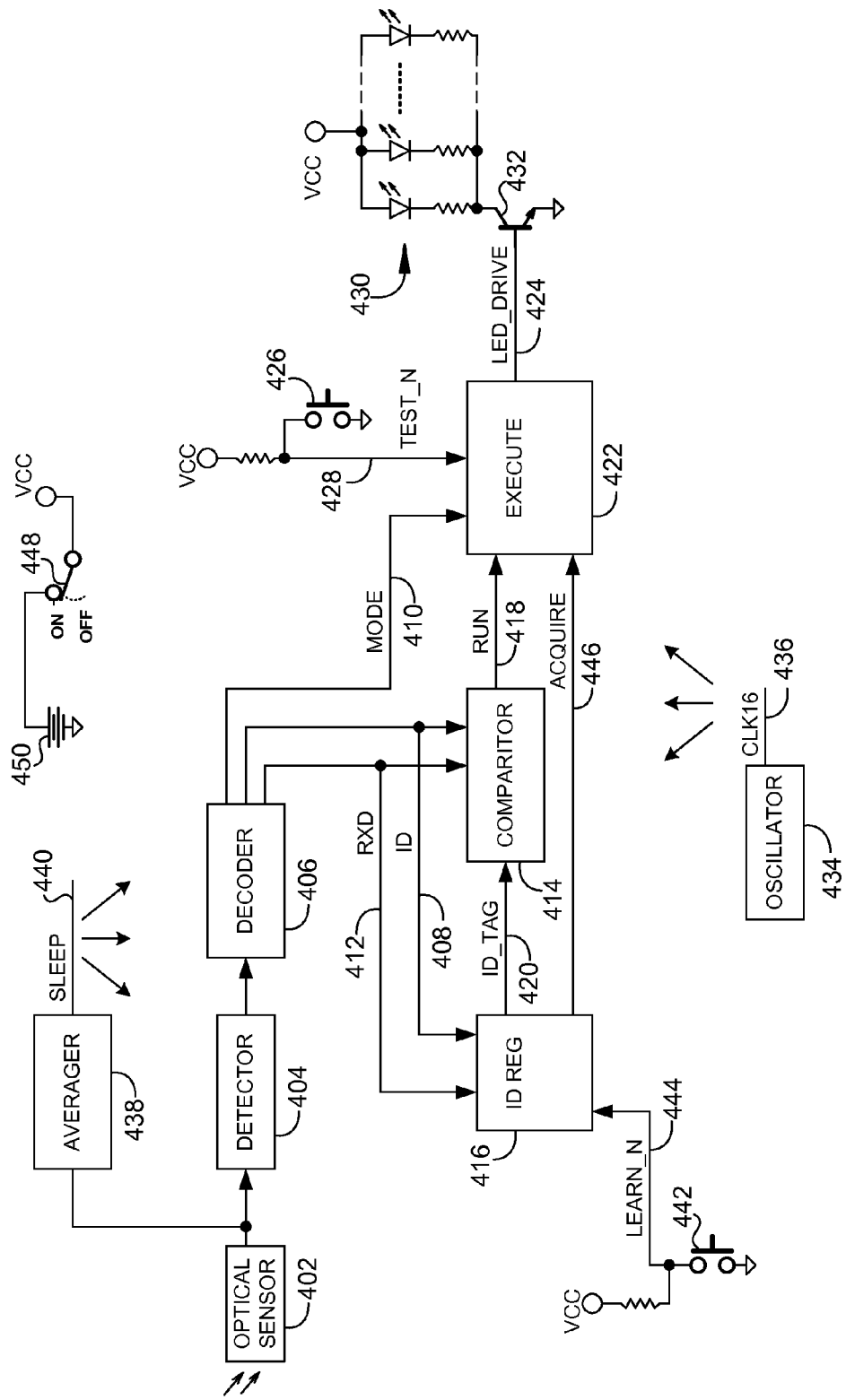
FIG. 4 shows a functional block diagram of the detached lighting unit.

Target Detached Lighting Unit Functional Block Operation, FIG. 4

FIG. 4 shows a functional block diagram of the detached lighting unit that responds to the encoded light produced by the just-described source flashlight. Optical Sensor 402 responds to visible light and produces a corresponding output voltage, essentially translating the visible light intensity into a proportional voltage. Such devices, e.g., ams AG's TSL252R, are well known in the art, and not described further here.

Detector block 404 identifies levels of received light that are above and below a dynamically adjusted threshold. These high and low periods of time roughly correspond to the high and low portions of the example encoded signal. Details of this block follow in a later section.

Decoder block 406 identifies the distinctive preamble, described earlier, among the received pattern of high and low periods, then captures the subsequent stream of high and low periods, translating them into received binary ones and zeroes. The received stream of binary bits are assembled and presented as the eight-bit ID tag ID 408 and the three-bit Mode value MODE 410. Signal RXD 412 is a control indication, and goes high to flag that an ID/MODE set has been successfully received. Details of this block also follow in a later section.

When the RXD signal is active, Comparitor block 414 compares the received ID tag against the value ID_TAG 420 dedicated to this lighting unit and stored as a digital value in ID Reg block 416. If the compare is successful, the Comparitor block activates signal RUN 418, which in turn instructs Execute block 422 to perform the function via signal LED_DRIVE 424 as selected by the received mode value 410. The execution modes involve activating LEDs 430 via transistor 432 in various ways, and the following are examples:

| MODE | action |
| --- | --- |
| 000 | activate the LEDs at full intensity for three minutes; |
| 001 | activate the LEDs at full intensity for ten minutes; |
| 010 | activate the LEDs at full intensity for thirty minutes; |
| 011 | activate the LEDs at reduced intensity for three minutes; |
| 100 | activate the LEDs at reduced intensity for ten minutes; |
| 101 | activate the LEDs at reduced intensity for thirty minutes; |
| 110 | deactivate the LEDs immediately; |
| 111 | stop responding to activation requests for thirty minutes. |

Mode 111, which deactivates the lighting unit for a timed period, is useful when the user wishes to use a different lighting unit nearby, but does not want this unit to activate and thus drain its batteries unnecessarily. Likewise, battery energy is saved with the reduced intensity modes (011, 100, and 101) when a lower light intensity is sufficient. These various executions are achieved with timers and pulse-width-modulated LED activation, which are all well known in the art, and are thus not detailed further here.

Push-button switch 426 instructs the Execute block via signal TEST_N 428 to activate the LEDs regardless of the state of signal RUN 418. This is useful to ensure that the unit is basically functional, and that the batteries contain sufficient charge.

As with the oscillator of the previously described source flashlight operation, Oscillator 434 here provides a free-running clock CLK16 436 which serves as the general operating clock signal for all functional blocks implementing clocked digital processes. The period of this clock is sixteen times that of the clock used to encode the companion source flashlight's transmission. This provides for a high resolution of decoding the received information stream, as will be further explained in a later section.

Modern processing IC devices often include power-down modes, sometimes referred to as sleep modes, for conserving power when not needed. Averager block 438 monitors the output of the optical sensor and activates signal SLEEP 440 when the average light level rises above a predefined threshold, set to coincide with the amount of ambient light that would be present during daytime. SLEEP signal in turn causes the various processing blocks to enter a power-down state, thus conserving battery energy during those times when the detached lighting unit would not be needed.

Push button 442, via signal LEARN_N 444, allows the user to update the detached lighting unit with a new ID Tag as communicated by a source flashlight. A momentarily activation of the push button (signal LEARN_N goes low) places ID Reg block 416 into a learning mode, whereby signal ACQUIRE 446 is activated, causing the Execute block 422 to blink the LEDs, thus alerting the user that the lighting unit is ready to receive an updated ID Tag. The ID Reg block 416 then replaces its stored ID Tag value, i.e., digital pattern, with an ID 408 value received via the Optical Sensor/Detector/Decoder path, but only if at least two consecutive, identical ID values, as qualified by signal RXD 412, are received within a fixed period, where the fixed period corresponds to approximately the time it takes to transmit four complete information packets. When the ID Reg block has successfully loaded a new ID Tag, it de-activates the ACQUIRE signal, and since the newly stored ID Tag now matches the one being communicated by the source flashlight, the Comparitor block activates the RUN signal, causing the Execute block to activate the LEDs according to the mode communicated by the source flashlight. This further alerts the user that the new ID Tag has been successfully loaded.

If Push button 442 is activated for an extended period of time, e.g., at least three seconds, ID Reg block 416 loads a default digital pattern as an ID Tag value, e.g., all-zeros, and activates signal ACQUIRE 446 just long enough to cause the Execute block 422 to blink the LEDs just once, altering the user that the default ID Tag value has been loaded. Since this default value is the same for all source flashlight and detached lighting units, this feature provides a safety "fall-back" option for the user, whereby all source flashlights and detached lighting units could conceivably be forced to use the default ID Tag. From this initial reliable state, the user could then proceed to methodically update all source flashlights and detached lighting units with new ID Tags.

One embodiment of the detached lighting unit uses a non-volatile IC device, e.g., a Rohm BR24C I2C serial PROM, to store the ID Tag. In this way, the lighting unit can be de-powered without losing the stored ID Tag. De-powering might occur, for example, when changing batteries.

As with the power switch of the source flashlight, SPST switch 448 provides a means to disconnect battery voltage 450 from the circuitry when the detached lighting unit is not in use. Battery 450 could be replaceable batteries, or rechargeable batteries reenergized during daylight from solar cells. The latter option is not described in detail here since the practice is well known in the art.

Figure 5:
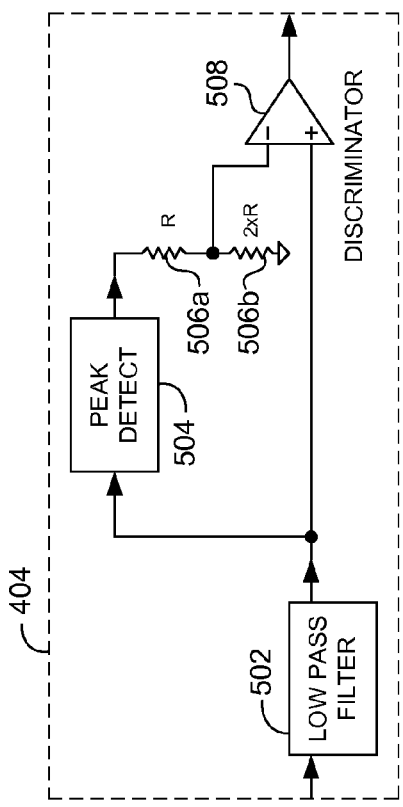
FIG. 5 shows details of the Detector block 404 introduced in FIG. 4.
Figure 6:
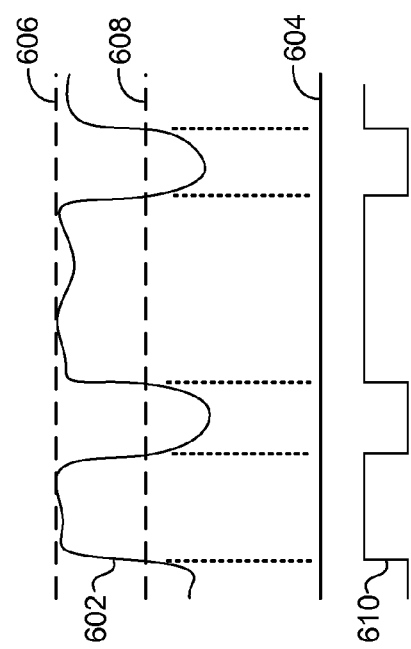
FIG. 6 shows an example input signal riding above zero voltage level due to a degree of ambient light.

Detached Lighting Unit Detector, FIGS. 5 and 6

FIG. 5 shows details of the Detector block 404 introduced in previous FIG. 4, and which identifies levels of received light that are above and below a dynamically adjusted threshold. Voltage inputs from Optical Sensor 402 shown in previous FIG. 4 are filtered by Low Pass Filter 502 in order to remove high frequency noise. The cutoff of this filter is set at approximately twice the frequency of the clock signal CLK16 436 in FIG. 4, thus allowing the basic form of the encoded information to pass relatively undistorted. Peak Detect block 504 tracks the peak level of the filter output, with a decay time approximately four times the period of the entire communication packet. Both low pass filters and peak detect circuits are common in the art, and their details are not included here. The peak voltage developed by the Peak Detect block is divided by two-thirds by resister network 506a and 506b. This divided voltage comprises the dynamic threshold against which the filtered signal is compared by Discriminator comparitor 508. Thus, received high portions of the received communication are higher than the dynamic threshold and cause the comparitor to output a high voltage, and low portions of the received communication are below the dynamic threshold and cause the comparitor to output a low voltage.

FIG. 6 shows an example Low Pass Filter output signal 602 riding above zero voltage level 604 due to a degree of ambient light. The dynamic threshold 608 is two-thirds of the peak level 606, and when compared in Discriminator comparitor 508 produces the resulting bit pattern output 610. Note that the amount of ambient light is exaggerated in this diagram for illustration. Since the source flashlight/detached lighting unit system is used at night, the amount of ambient light is minimal. Otherwise, the low pass filter would normally be AC-coupled to the peak detect and discriminator circuits.

Figure 7:
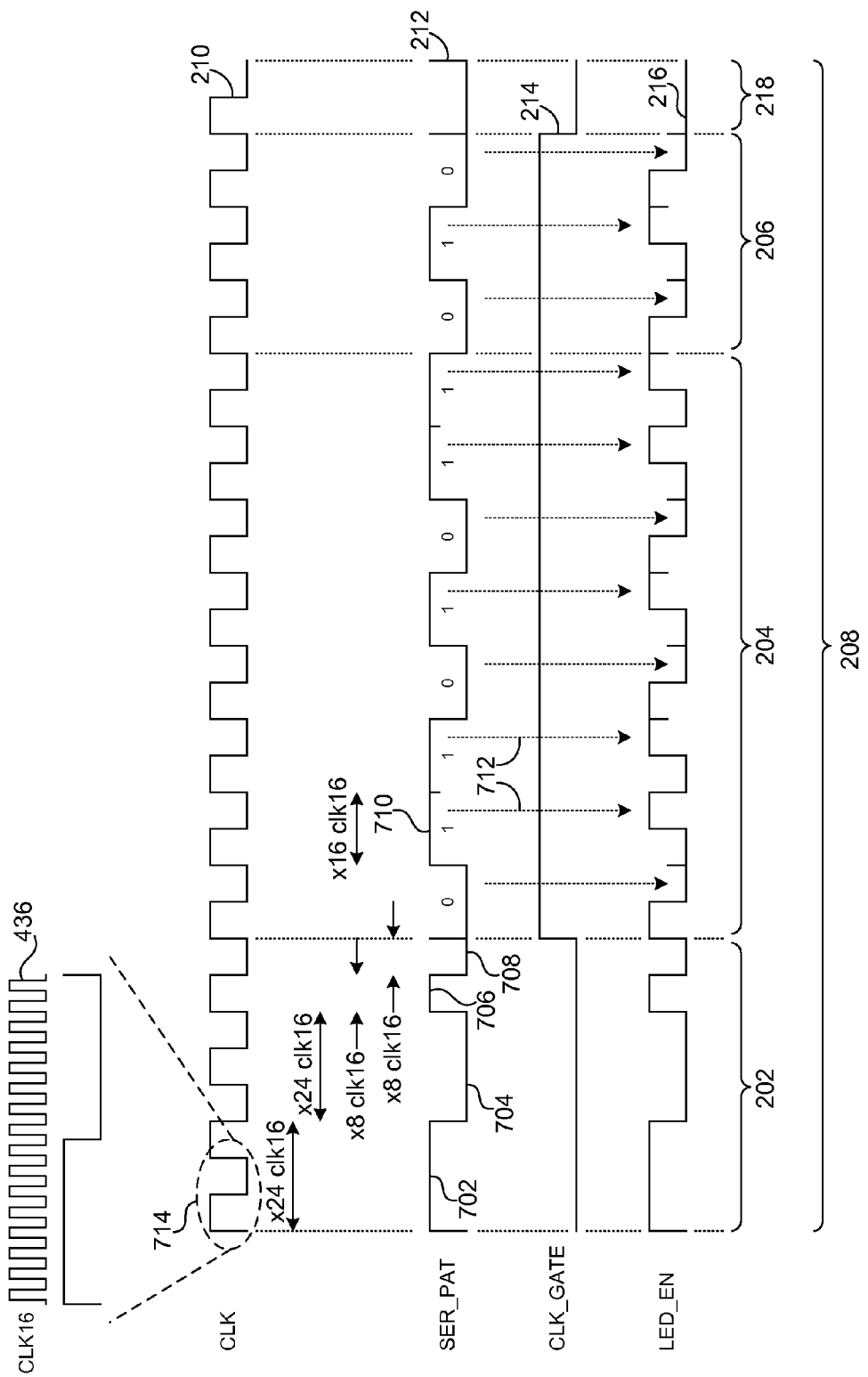
FIG. 7 is an enlarged version of the timing diagram shown in FIG. 2, but now with more detail added.

Clocking Characteristics of the Communicated Bit Pattern, FIG. 7

FIG. 7 is an enlarged version of the timing diagram shown originally in FIG. 2, but now with more detail added. Signal CLK 210 is the clock used by the source flashlight, and defines the bit timing of the transmitted bit pattern. Section 714 is shown expanded above, and the detached lighting unit clock CLK16 436 is shown in relative relationship, where it can be seen that approximately sixteen CLK16 signals occur for each CLK signal.

The first portion 702 and second portion 704 of the preamble 202 each span approximately twenty-four CLK16 periods, while the third portion 706 and fourth portion 708 each span approximately eight CLK16 periods. Each subsequent bit portion of ID Tag 204 and Mode 206 span sixteen CLK16 periods, as demonstrated by the second bit portion 710. As was explained previously, signal LED_EN 216, which comprises essentially the same form as the transmitted light signal, is created by logically XORing the original bit pattern SER_PAT 212 with CLK 210 during the active portion of CLK_GATE 214. As is the nature when XORing with a clock signal, the second half of each XORed bit position exhibits the same logical level as the original signal. Thus, as demonstrated by dotted arrows 712, the second half of the bit positions of signal LED_EN exhibit the same level as the associated bit position of SER_PAT. As will be explained later, this relationship is exploited when sampling the received signal in order to reconstruct the original bit pattern by the decoding block of the detached lighting unit.

Figure 8:
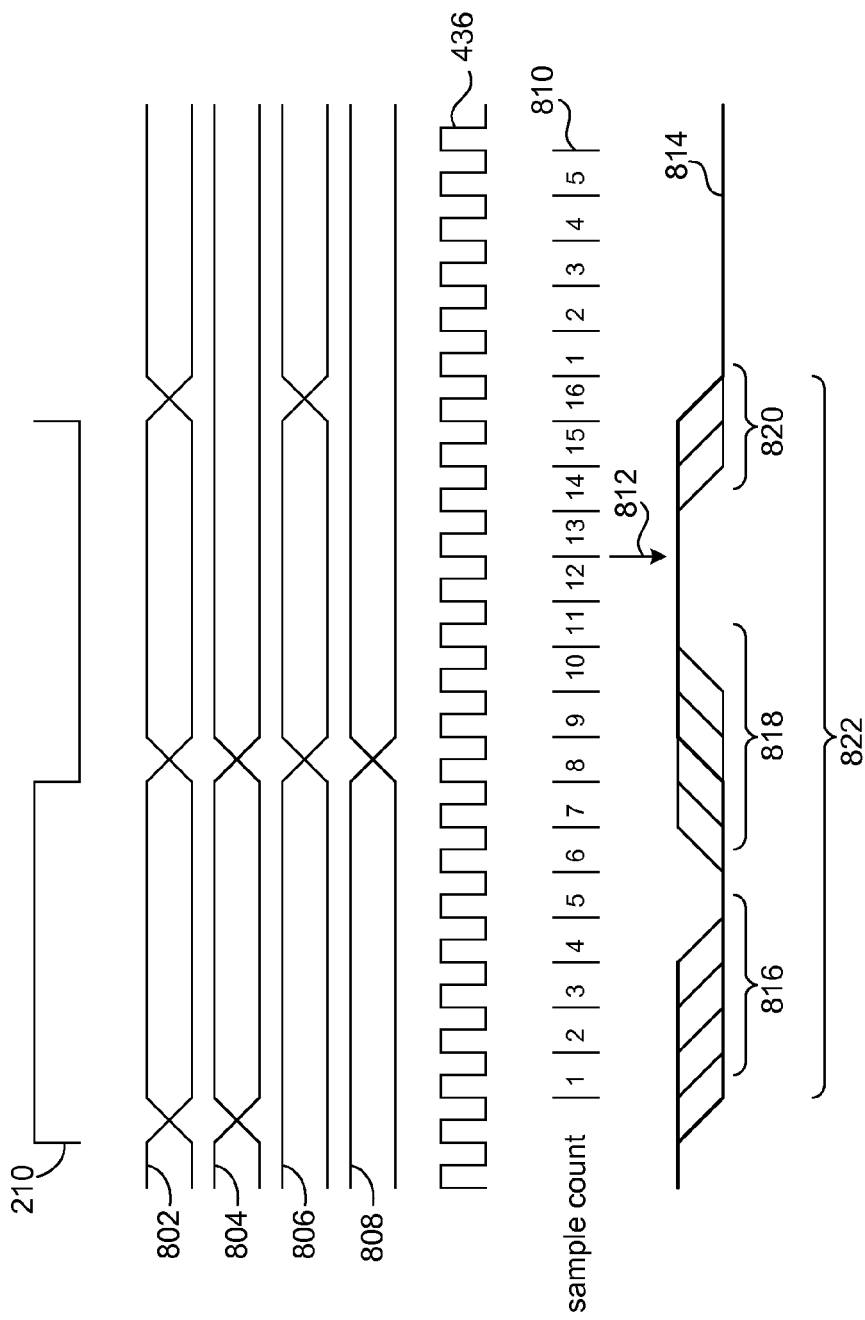
FIG. 8 shows details of the sampling methods used by the detached lighting unit.

Detached Lighting Unit Receive Sampling, FIG. 8

FIG. 8 shows details of the sampling methods used by the detached lighting unit to recover the original bit pattern transmitted by a companion source flashlight. Waveform 210 illustrates one period of the source flashlight clock signal. Waveforms 802, 804, 806, and 808 illustrate the transitions that occur when the original bit pattern is XORed with the clock, as occurs for the ID Tag and Mode portions of the communicated packet. Waveform 802 shows the transitions that occur when the original bit pattern was unchanged—either all ones, or all zeros—before, during, and after the clock period illustrated. Waveform 804 shows the transitions that occur when the original bit pattern is unchanged before the clock period illustrated, but changes for the next bit time. Waveform 806 shows the transitions that occur when the original bit pattern changes before the clock period illustrated, but remains unchanged for the next bit time. Finally, waveform 808 shows the transitions that occur when the original bit pattern changes both before and after the clock period illustrated.

Of note in these just-described illustrated waveforms is the observation that the XORed result always transitions in the middle of the bit period. As will be explained later, this behavior is exploited when reconstructing the received bit boundaries.

Clock signal 436 represents the detached lighting unit clock, which is sixteen times the frequency of the source flashlight clock 210. The two clock signals are shown here as aligned and synchronous for clarity, but in actual implementation they will exhibit an arbitrary alignment, and although closely matched in frequency, will in reality be asynchronous.

Sample count 810 is the output of a logical counter located in the Decoder block 406, introduced in previous FIG. 4, that tracks detached lighting unit clock occurrences. Clock span 822 illustrates on nominal bit time, while waveform 814 represents an example XORed bit pattern that transitions from high to low during the first half of the bit time, from low to high during the second half of the bit time, and then back to low at the end of the bit time. Due to the asynchronous nature between the source flashlight and lighting unit clocks, and also as a result of natural distortions in transmission and recovery of the signal, the transition times are not precisely predictable, as illustrated by the hatched lines associated with each of the three described transitions. However, even with the four example lighting unit clocks of uncertainty, the waveform is stable at time 812. As noted in the discussion of the previous figure, since this corresponds to the second half of the bit time, the polarity of the waveform matches the logical level of the original bit pattern.

Also as noted in the discussion of the previous figure, the XORed pattern always includes a transition in the middle of the bit time. This is shown as clock spans 818. This transition is used as an opportunity to recalibrate the sampling time, and upon detection of this transition sample count 810 is forced to a value of nine, which corresponds to the ideal location of the transition.

Similarly, as noted in waveforms 802 through 808 above, the bit pattern may or may not transition at the end of the bit time. If a transition is detected during clock span 820, however, the sample count is forced to a value of one, which corresponds to the ideal location of the end of the bit time. If no transition is detected, the sample count returns to a value of one by default after reaching sixteen to begin the next assumed bit time. Since a late ending transition could potentially occur after the sample count has returned to one, the sample count is also forced to a value of one if a transition is detected during clock span 816, which serves to re-start the bit time anew.

Figure 9:
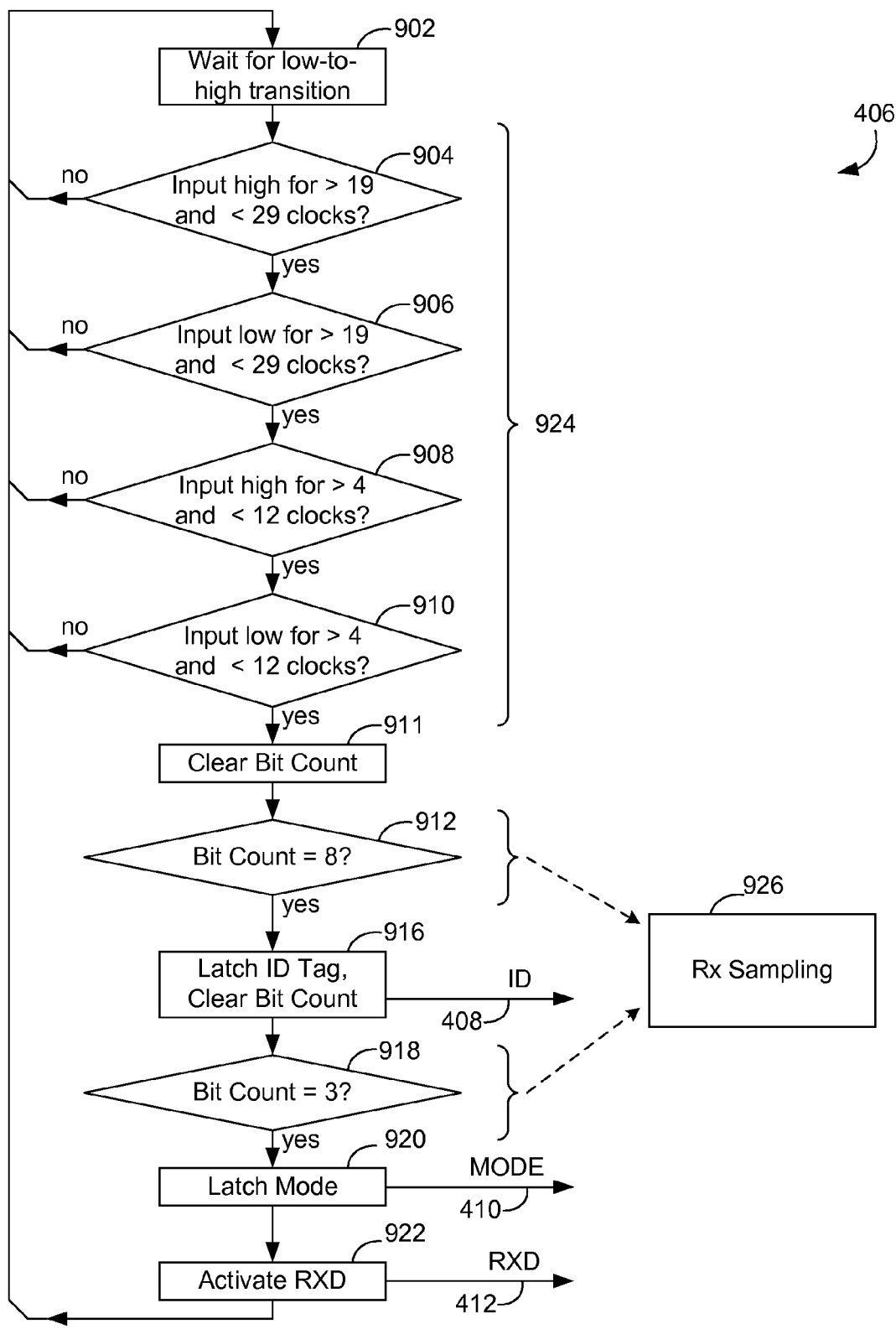
FIG. 9 shows the operation of Decoder block 406 introduced in FIG. 4.

Detached Lighting Unit Decoder, FIG. 9

FIG. 9 shows the operation of Decoder block 406 introduced previously in FIG. 4. When the detached lighting unit is not placed in power-down sleep mode, state 902 of the Decoder block continuously monitors Detector 404 for a low-to-high transition on the signal level, indicating the possible beginning of a transmitted packet, e.g., the end of end marker 218 shown previously in FIGS. 2 and 7. When a low-to-high transition is detected, state 904 counts the number of clock periods the input signal is high, using the detached unit clock CLK16 436 shown in previous FIG. 7. If the input signal is high for between twenty and twenty-eight clock periods, the operation moves on to state 906, otherwise the operation returns to state 902 to wait for another possible beginning of a transmitted packet. State 904 corresponds to section 702, the beginning of the preamble, of the waveform shown previously in FIG. 7.

Whereas state 904 determined the proper number of clock periods that the input signal was high, state 906 performs the same, but for an input signal that is now low. If the input signal is low for between twenty and twenty-eight clock periods, the operation moves on to state 908, otherwise the operation returns to state 902. State 906 corresponds to section 704 of the waveform shown previously in FIG. 7.

State 908 determines whether the input signal is high for the proper length of corresponding section 706 of the waveform shown previously in FIG. 7. If the input signal is high for between five and eleven clock periods, the operation moves on to state 910, otherwise the operation returns to state 902.

State 910 determines whether the input signal is low for the proper length of corresponding section 708 of the waveform shown previously in FIG. 7. If the input signal is low for between five and eleven clock periods, the operation moves on to state 911, otherwise the operation returns to state 902.

At this point, having traversed the four states collectively grouped as 924, the Decoder block has reached the end of the preamble, and now assumes that the next eight bits comprise the arriving ID Tag.

State 911 clears a Bit Count value that is explained further in FIG. 10, which follows later.

State 912 assembles the subsequent decoded eight bits as an arriving ID Tag, counting each bit via the Bit Count. The operation of this assembly is performed in Rx Sampling block 926, and details of this are also explained in FIG. 10, which follows. Once the Bit Count of state 912 reaches eight, the assembly of all eight bits of the presumed new ID Tag is complete, and the final value is latched in state 916 and presented out of the block as ID 408. The Bit Count is again cleared in preparation for assembling the subsequent Mode value.

Similarly, state 918 assembles the subsequent decoded three bits as an arriving Mode value. The operation of this assembly is also performed in block 926, where details are explained in later FIG. 10. Once the Bit Count of state 918 reaches three, the assembly of all three bits of the presumed new Mode is complete, and the final value is latched in state 920 and presented out of the block as MODE 410.

Finally, state 922 activates RXD 412 for one clock period before returning back to state 902 in preparation to receive the next transmitted packet.

It is noted that End Marker 218 of previous FIG. 7 guarantees that the beginning of each packet includes a low-to-high transition to begin the first section 702 of the preamble.

Figure 10:
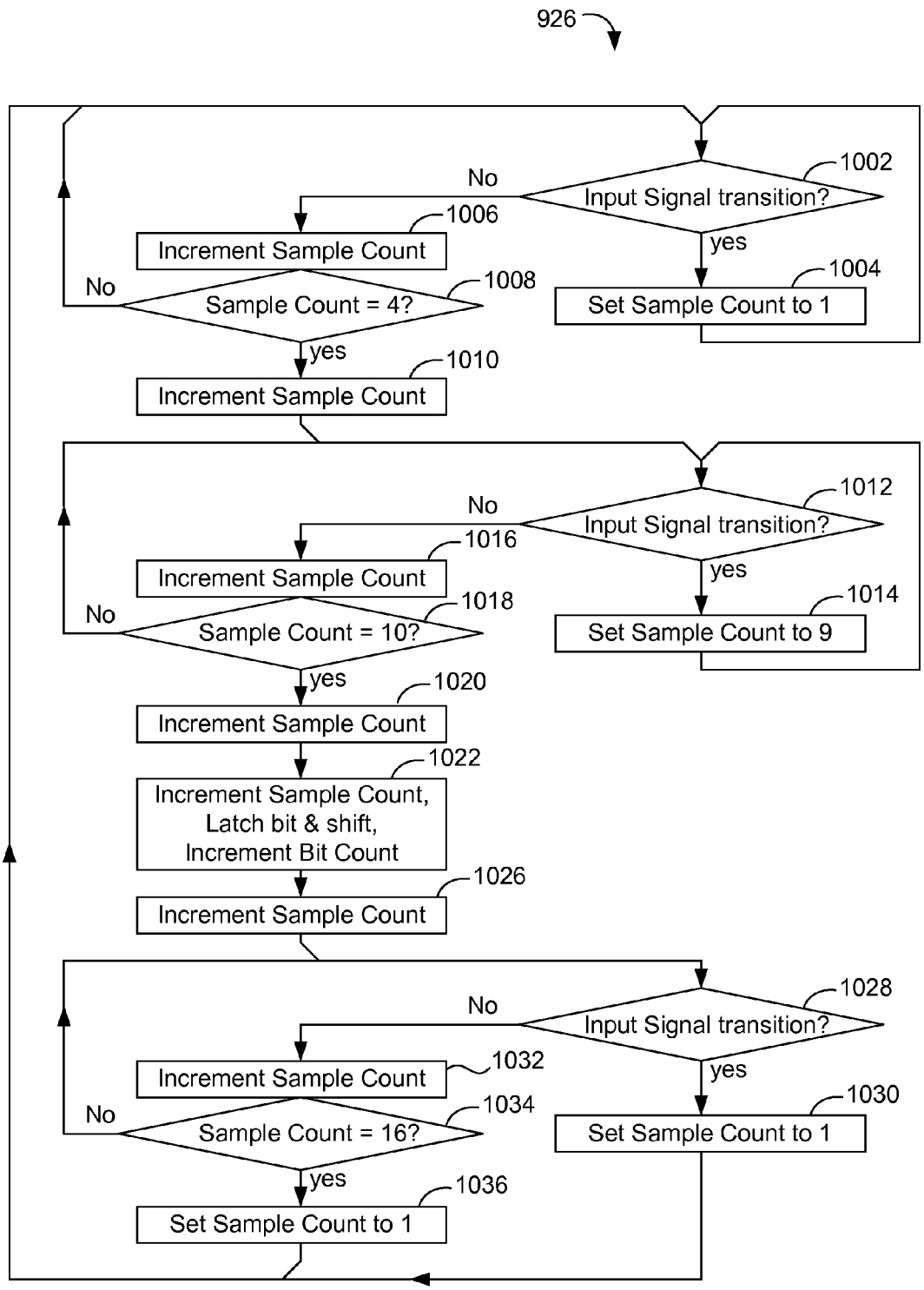
FIG. 10 shows the operation of Rx Sampling block 926 shown in FIG. 9.

Detached Lighting Unit Rx Sampling Block, FIG. 10

FIG. 10 shows the operation of Rx Sampling block 926 shown in previous FIG. 9 and follows as an extension of the sampling methods introduced earlier in FIG. 8. In this figure, both Sample Count and Bit Count are logical counters that can be loaded or incremented as directed. Note that each box in this figure lasts for a duration of one detached lighting unit clock period, while the decision diamonds are essentially instantaneous, i.e., could be implemented using combinatorial, non-registered logic.

At the beginning of each bit time, the Rx Sampling block monitors the input signal for a transition as indicated in decision diamond 1002. As explained in the previous section, an early transition could result from a late occurring last transition of the previous bit time. Thus, if a transition is detected, the Sample Count is reset to one in step 1004, restarting the definition of this bit time. If no transition is detected, the Sample Count increments in step 1006. If the Sample Count has not yet reached four in step 1008, the operation returns to step 1002, monitoring for an input transition.

If the Sample Count has reached four in step 1008, the Sample Count is incremented once more in step 1010, and the operation once more monitors for input signal transitions in step 1012. Note that the preceding steps starting with step 1002 and ending with step 1008 correspond to time period 816 shown in previous FIG. 8.

The Rx Sampling block is now monitoring for mid-bit transitions. This corresponds to time period 818 shown in previous FIG. 8. In step 1012, if a transition is detected, the Sample Count is loaded with a value of nine in step 1014, establishing a mid-bit position. If no transition is detected, the Sample Count increments in step 1016. If the Sample Count has not yet reached ten in step 1018, the operation returns to step 1012, continuing to monitor for mid-bit transitions.

If the Sample Count has reached ten in step 1018, the Sample Count is incremented once more in step 1020, and yet again in step 1022, bringing the Sample Count now to a value of twelve. As shown previously in FIG. 8, this corresponds to sample time 812, and so the Rx Sampling block now latches the bit level while sifting the previously latched bit values left in a shift register, and increments the Bit Count. The Sample Count is then incremented to a value of thirteen in step 1026.

As shown previously in FIG. 8, the Rx Sampling block operation is now entering time period 820 in previous FIG. 8, where possible end-bit transitions may occur. If input signal transitions are detected in step 1028, the Sample Count value is set to one in step 1030. This establishes the beginning of a new bit time, and the operation returns to step 1002. If no transitions are detected in step 1028, then the Sample Count is incremented in step 1032. If the Sample Count has not yet reached sixteen in step 1034, the operation returns to step 1028, continuing to monitor for end-bit transitions. If the Sample Count has reached sixteen in step 1034, an end to this bit time is assumed and the Sample Count is set to one in step 1036, establishing the beginning of a new bit time, and the operation then returns to step 1002.

As explained above, each latched bit level in step 1022 is accompanied by a left-shift of previously latched bits. When the Bit Count reaches either eight in step 912 or three in step 918 of previous FIG. 9, the shift register will contain either the received eight-bit ID value, or the three-bit Mode value, respectively.

Figure 11:
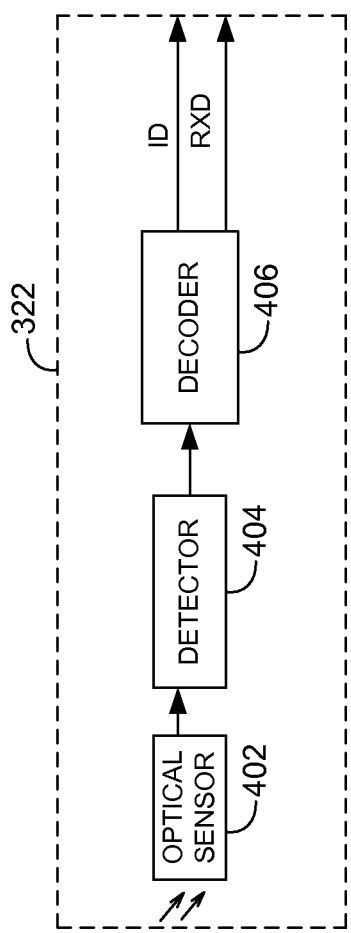
FIG. 11 shows the details of the ID Tag Update block 322 from FIG. 3.

Source Flashlight ID Tag Update, FIG. 11

FIG. 11 shows the details of the ID Tag Update block 322 from previous FIG. 3. The three blocks shown here, Optical Sensor 402, Detector 404, and Decoder 406, will be recognized as the initial receive path processing of the detached lighting unit, as shown in previous FIG. 4, and the processing is identical in the Update block 322 as they are in FIG. 4 of the detached lighting unit, other than that the Mode signal 410 of the detached lighting unit is not used in the Update block 322 of the source flashlight.

Referring now back to FIG. 3, if push button 318 is activated momentarily, signal LEARN_N 320 goes low, placing ID Tag Reg block 306 into a learning mode, whereby signal ACQ 328 is activated, causing the Serial Generator block 304 to blink the LEDs, thus alerting the user that the source flashlight is ready to receive an updated ID Tag. The ID Tag Reg block 306 then replaces its stored ID Tag value with an ID 330 value received via the Optical Sensor/Detector/Decoder path, but only if at least two consecutive, identical ID values, as qualified by signal RXD 332, are received within a fixed period, where the fixed period corresponds to approximately the time it takes to transmit four complete information packets. When the ID Tag Reg block has successfully loaded a new ID Tag, it de-activates the ACQ signal, and the Serial Generator block ceases blinking the LEDs, further alerting the user that the new ID Tag has been successfully loaded.

In this way, a source flashlight can be loaded with an ID Tag from another source flashlight.

If Push button 318 is activated for an extended period of time, e.g., at least three seconds, ID Tag Reg block 306 loads a default ID Tag value, e.g., all-zeros, and activates signal ACQ 328 just long enough to cause the Serial Generator block 304 to blink the LEDs just once, altering the user that the default ID Tag value has been loaded.

In one embodiment, an additional ID Tag update feature allows the user to load a randomly assigned value. Here, the user holds push button 318 active for approximately three seconds, then releases it, and pushes the button again an additional two times. The value from a free-running counter in ID Tag Reg block 306 is latched at the moment the push button is activated the third time, effectively providing a random digital pattern value for loading as an updated ID Tag. Once one flashlight is updated with a random ID Tag, other flashlights and detached lighting units can then be matched via the learning features already described.

CONCLUSION, RAMIFICATIONS, AND SCOPE

It can be seen that by the means described above an inventively capable flashlight can be used to easily and selectively activate a number of strategically placed detached lighting units, thus providing convenient temporary illumination for nighttime excursions. Since the detached lighting units respond only to the specific modulation of the inventively capable flashlight, battery energy is optimally conserved.

The operation of the embodiments has been described in general logic terms, and one skilled in the art will recognize that the operations can be implemented in a variety of ways, including micro-processors, FPGA devices, and CPLDs.

Although the preferred embodiment employs a type of flashlight whose primary purposes are to create a focused beam of light, and to use that beam of light to communicate encoded information, it will be evident that the two functions could be combined in devices with other functions, such as cell phones.

The various nomenclatures used in this invention are not intended in any way to limit the scope of the invention; and thus, there is no intent of excluding equivalents, but on the contrary it is intended to cover any and all equivalents that may be employed without departing from the spirit and scope of the invention.

I claim:

1. A detached lighting system responsive to control by modulated visible light, comprising:
   a) a detached lighting unit removed from AC powering that responds selectively to modulated visible light, whereby,
      i) said detached lighting unit includes batteries for powering said detached lighting unit;
      ii) said modulated light includes an encoded specific pattern;
      iii) said detached lighting unit only responds selectively when said encoded specific pattern matches a pattern held in storage by said detached lighting unit;
      iv) said detached lighting unit responds selectively to said matching encoded specific pattern by changing modes of operation;
      v) one of said modes of operation includes activation of illumination LEDs;

b) a handheld flashlight that includes means to create said modulated visible light that includes said encoded specific pattern, whereby,
  i) said handheld flashlight uses LEDs for generating light;
  ii) said flashlight LEDs can be activated controllably according to the said encoded specific pattern;
  iii) said flashlight holds said encoded specific pattern in storage;
  iv) said flashlight LEDs can optionally also be activated controllably according to additional information associated with said detached lighting unit modes of operation;
  whereby a user can control nighttime illumination by shining said handheld flashlight on said detached lighting unit.

2. The detached lighting system according to claim 1, wherein another of said modes of operation of said detached lighting unit includes activation of said illumination LEDs for a fixed period of time.

3. The detached lighting system according to claim 1, wherein another of said modes of operation of said detached lighting unit includes activation of said illumination LEDs for a period of time as communicated by mode information included in the said optional additional information of said flashlight.

4. The detached lighting system according to claim 1, wherein another of said modes of operation of said detached lighting unit includes activation of said illumination LEDs with different levels of intensity as communicated by mode information included in the said optional additional information of said flashlight.

5. The detached lighting system according to claim 1, wherein the said detached lighting unit includes means to acquire a new said specific pattern via the said modulated visible light of said flashlight and place this said new specific pattern in said detached lighting unit storage.

6. The detached lighting system according to claim 1, wherein a first of said handheld flashlight includes means to acquire a new said specific pattern via said modulated visible light from a second of said handheld flashlight and place this said new specific pattern in said first flashlight storage.

7. The detached lighting system according to claim 1, wherein said handheld flashlight includes a modulated light encoding scheme that includes logically XORing a portion of the modulated light encoding signal with a second signal with periodic alternating logic levels.

8. The detached lighting system according to claim 1, wherein the said detached lighting unit includes means to reduce power consumption when the level of ambient light is detected to rise above a fixed threshold.

9. The detached lighting unit according to claim 1, including means to force a default value for said digital pattern, and place this said default digital pattern into said storage.

10. The detached lighting unit according to claim 1, including solar cells for recharging said batteries.

11. The detached lighting system according to claim 1, wherein said handheld flashlight includes a means to acquire a new randomly assigned said digital pattern.

12. The detached lighting system according to claim 1, wherein the said detached lighting unit comprises:
  c) an enclosure;
  d) batteries for supplying power;
  e) LEDs for illumination;
  f) an optical sensor that translates the visible light intensity of said modulated light into proportional voltage;
  g) said proportional voltage provided to a detector and decoder, which together extract a digital pattern from encoded modulation of said visible light;
  h) said digital pattern provided to a comparitor, which causes activation of said illumination LEDs when said extracted digital pattern matches a stored digital pattern read from storage;
  whereby when the modulated light of said capable handheld flashlight is directed at the said detached lighting unit, said lighting unit activates said LEDs, providing illumination.

13. The detached lighting unit according to claim 1, wherein the said handheld flashlight comprises:
  i) LEDs for providing illumination;
  j) a serial generator for modulating said LEDs with a digital pattern;
  k) said digital pattern provided by local storage;
  l) said digital pattern selected to match a pattern used by said detached lighting unit;
  whereby said target detached lighting unit can be controlled by communicating said digital pattern by way of said modulated visible light of said source.

* * * * *